US012189600B2

(12) United States Patent
Stolze et al.

(10) Patent No.: US 12,189,600 B2
(45) Date of Patent: Jan. 7, 2025

(54) DISTRIBUTING ROWS OF A TABLE IN A DISTRIBUTED DATABASE SYSTEM

(71) Applicant: International Business Machines Corporation, Armonk, NY (US)

(72) Inventors: Knut Stolze, Hummelshain (DE); Luis Eduardo Oliveira Lizardo, Böblingen (DE); Reinhold Geiselhart, Rottenburg-Ergenzingen (DE); Felix Beier, Haigerloch (DE)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 17/178,618

(22) Filed: Feb. 18, 2021

(65) Prior Publication Data

US 2022/0261389 A1    Aug. 18, 2022

(51) Int. Cl.
G06F 16/22    (2019.01)
G06F 16/2455    (2019.01)
G06F 16/901    (2019.01)
H04L 67/10    (2022.01)

(52) U.S. Cl.
CPC .... *G06F 16/2282* (2019.01); *G06F 16/24564* (2019.01); *G06F 16/9017* (2019.01); *H04L 67/10* (2013.01)

(58) Field of Classification Search
CPC ............ G06F 16/2282; G06F 16/9017; G06F 16/24564; H04L 67/10
See application file for complete search history.

(56) References Cited

U.S. PATENT DOCUMENTS

| 7,035,851 | B1  |   | 4/2006  | Sinclair |
| 8,868,484 | B2  | * | 10/2014 | Aggarwal ............. G06F 16/283 |
|           |     |   |         | 707/602 |
| 2012/0109892 | A1 |   | 5/2012 | Novik |
| 2014/0344221 | A1 |   | 11/2014 | Novik |

(Continued)

FOREIGN PATENT DOCUMENTS

| CN | 116868183 A | 10/2023 | |
| EP | 4295243 A1 | 12/2023 | |
| WO | WO-2014015492 A1 * | 1/2014 | ....... G06F 17/30575 |

OTHER PUBLICATIONS

Fatma Özcan, Emerging trends in the enterprise data analytics: connecting Hadoop and DB2 warehouse, Conference Paper • Jun. 2011, https://www.researchgate.net/publication/221214817 (Year: 2011).*

(Continued)

Primary Examiner — Mark D Featherstone
Assistant Examiner — Faezeh Forouharnejad
(74) Attorney, Agent, or Firm — Joseph P. Curcuru

(57) ABSTRACT

In an approach to copying of table rows across logical nodes in a distributed database system comprising a plurality of logical nodes, for each logical node of a plurality of logical nodes, a connection is made to a current logical node of the plurality of logical nodes. One or more rows are selected from source nodes of the logical nodes to be stored in a target table on the current logical node, where the one or more rows are selected based on a distribution rule for distributing data in the distributed database system. The rows are stored into the target table, where the rows are pulled from the source nodes and stored in the current logical node.

20 Claims, 4 Drawing Sheets

(56) References Cited

U.S. PATENT DOCUMENTS

| | | |
|---|---|---|
| 2016/0078023 A1 | 3/2016 | Schalk |
| 2016/0147805 A1* | 5/2016 | Benke .................. G06F 16/278 707/741 |
| 2017/0083515 A1 | 3/2017 | Brodt |
| 2018/0101555 A1 | 4/2018 | Boehme |

OTHER PUBLICATIONS

Manish Bhide et al. (Adaptive Push-Pull: Disseminating Dynamic Web Data, hereinafter Bhide), May 2002, (Year: 2002).*

Elmore, et al., "Squall: Fine-Grained Live Reconfiguration for Partitioned Main Memory Databases", SIGMOD '15: Proceedings of the 2015 ACM SIGMOD International Conference on Management of Data, May 2015, pp. 299-313, <https://dl.acm.org/doi/10.1145/2723372.2723726>.

Gosh, et al., "Morphus: Supporting Online Reconfigurations in Sharded NoSQL Systems", ICAC '15: Proceedings of the 2015 IEEE International Conference on Autonomic Computing, Jul. 2015, 10 pages, <https://dl.acm.org/doi/abs/10.1109/ICAC.2015.42>.

International Search Report and Written Opinion, International Application No. PCT/EP2022/053728, Mailed Jun. 7, 2022, 12 pages.

Stolze, et al., "Distributing Rows of a Table in a Distributed Database System", International Application No. PCT/EP2022/053728, International Filing Date Feb. 16, 2022, 30 pages.

Andrews, A., "Improving PowerCenter Performance with IBM DB2 Range Partitioned Tables", Informatica Corporation 2011, pp. 1-6.

Disclosed Anonymously et al., "Improving Row Organization of a Table in a Distributed Database System", ip.com Prior Art Database Technical Disclosure, IPCOM/000263153D, Aug. 3, 2020, pp. 1-4.

IBM Knowledge Center, "Current_Dbpartitionnum Special Register", Db2 11.5, Accessed Feb. 4, 2021, pp. 1-2, <https://www.ibm.com/support/knowledgecenter/en/SSEPGG_11.5.0/com.ibm.db2.luw.sql.ref.doc/doc/r0059834.html>.

IBM Knowledgecenter, "Dbpartitonnum Scalar Function", Db2 11 5, Accessed Oct. 23, 2020, pp. 1-2, <https://www.ibm.com/support/knowledgecenter/en/SSEPGG_11.5.0/com.ibm.db2.luw.sql.ref.doc/doc/r0000832.html>.

IBM Knowledgecenter, "Synopsis Tables", Db2 11.5, Accessed Oct. 23, 2020, 1 Page, <https://www.ibm.com/support/knowledgecenter/en/SSEPGG_11.5.0/com.ibm.db2.luw.admin.dbobj.doc/doc/c0061454.html>.

* cited by examiner

DISTRIBUTING ROWS OF A TABLE IN A DISTRIBUTED DATABASE SYSTEM

BACKGROUND

The present invention relates to the field of digital computer systems, and more specifically, to a method for distributing rows of a table in a distributed database system.

Storing a table in a distributed database system may be performed by assigning the rows of the table to the logical nodes on which they have to be stored. After assigning the rows to the logical nodes, the rows may be stored in the respective logical nodes. However, this process may be a resource intensive task.

SUMMARY

Embodiments of the present invention include a computer-implemented method, computer program product, and system for distributing rows of a table in a distributed database system. In a first embodiment, for each logical node of a plurality of logical nodes, a connection is made to a current logical node of the plurality of logical nodes. One or more rows are selected from source nodes of the logical nodes to be stored in a target table on the current logical node, where the one or more rows are selected based on a distribution rule for distributing data in the distributed database system. The rows are stored into the target table, where the rows are pulled from the source nodes and stored in the current logical node.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for a distributed database system comprising a plurality of logical nodes. The computer system is configured for: connecting to each logical node of the distributed database system; and controlling each of the connected-to-logical node to: identify or select rows from source nodes of the plurality of logical nodes that will be stored in a target table on the logical node; and retrieve the identified rows and store them into the target table.

BRIEF DESCRIPTION OF THE SEVERAL VIEWS OF THE DRAWINGS

In the following embodiments of the invention are explained in greater detail, by way of example only, referring to the drawings in which.

DETAILED DESCRIPTION

Figure 1:
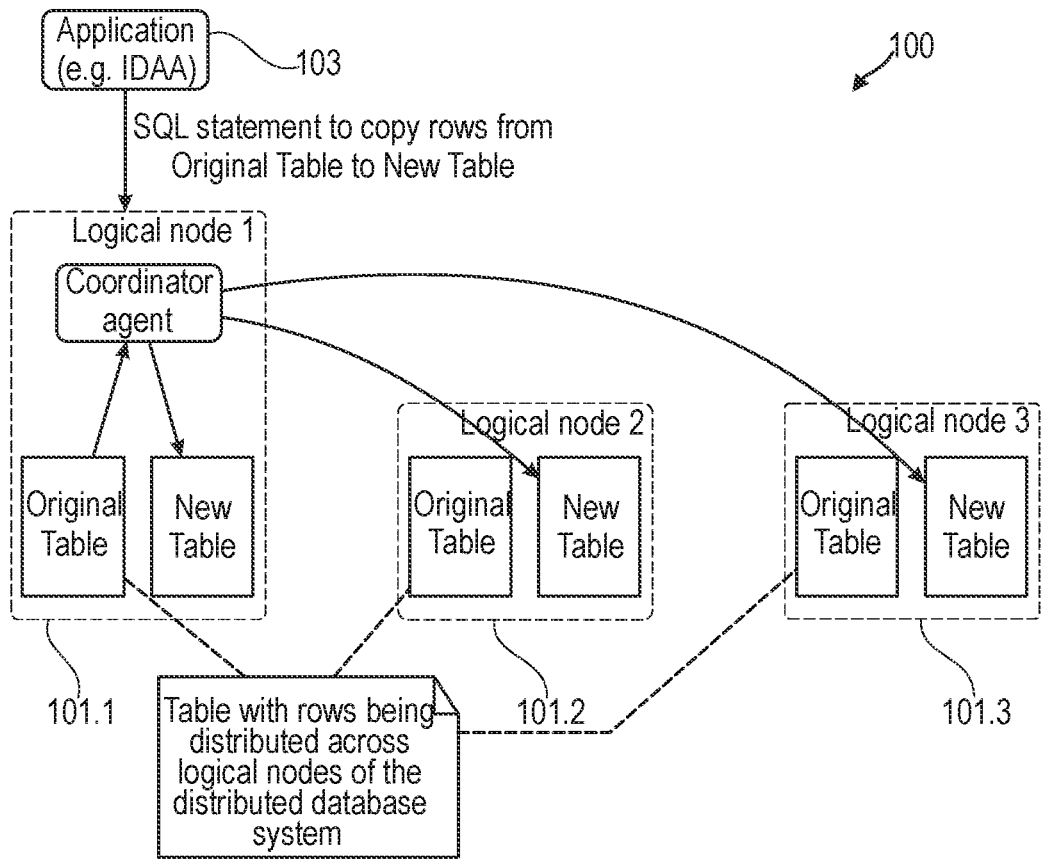
FIG. 1 depicts a distributed database system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The distributed database system may comprise multiple computers or machines. Two or more logical nodes may coexist on the same machine of the distributed database system. The logical nodes that coexist on the same machine may share processing resources such as CPU and may have their own or distinct storage area for storing data. This may make a machine run as if it were two or more independent machines. The logical nodes may be associated with identifiers such as numbers.

The distributed database system may be configured to store one or more tables on the logical nodes of the distributed database system. For that, a distribution rule may be used to assign each row of the table to one of the logical nodes on which it is to be stored. After assigning the rows to the respective nodes, a storage method may be used to store the rows into respective logical nodes. A row or record is a collection of related data items such as a name, date of birth and class of a particular user. A row represents an entity, wherein an entity refers to a user, object, or concept about which information is stored in the record.

If, for example, the table is not yet stored in the distributed database system, the distribution rule may be applied on the table and the storage method may require copying the rows from where the table is currently stored into the respective logical nodes. This initial storage may result in each logical node of at least part of the plurality of logical nodes having an initial or original table that stores rows of the table. The distribution rule of the initial storage method may be referred to as initial distribution rule.

If, in another example, the table is already stored on the distributed storage system e.g., after the initial storage, and the initial distribution rule has changed, the new distribution rule may be applied on the original table stored on each of the logical nodes and the storage method may advantageously be performed so that the rows are copied into respective logical nodes. In this case, the newly distributed rows are stored on a table referred to as new table. That is, the logical node may comprise an original table comprising the rows according to an initial distribution method and a new table comprising the rows according to another distribution method that may be different from the initial distribution method. The distribution method may consist of the application of a distribution rule and the execution of a storage method. The distribution rule of the distribution method that is applied after the initial distribution of the table or after the redistribution of the table may be referred to as a new distribution rule.

The distribution rule may comprise one or more conditions on one or more attributes of the table to be stored on the distributed storage system. The one or more attributes may be referred to as the distribution key. For example, the distribution rule may require that the rows representing entities having names starting with letter A be stored on logical node number 1 etc.

The present subject matter may efficiently store the distributed rows as follows. Instead of processing all locally stored rows and distributing them to the desired target node, the rows that shall be stored on the current node are selected from all logical nodes and then pulled to the current node. In other words, instead of pushing the rows from all logical nodes to the current node, the rows are pulled from the source nodes and the current logical node is the target node. The present subject matter may save resources compared to a pushing approach. For example, the pushing approach may require that one logical node is handling the redistribution. That one node retrieves all rows from all logical nodes. For each row, it calculates the target node and sends the row there. Thus, three logical nodes are involved for each row: the source node, the current node handling the redistribution, and the target node. The present method may improve upon this pushing approach as the target node and the current node handling the redistribution are the same node and it is no longer necessary to send the rows from the current node to the target node. The rows are already at the target node. The consequence may be that the current node handling the redistribution does not process all rows but only the subset of the rows that shall be stored at this node.

According to one embodiment, the rows of the table are associated with each node of the at least part of the plurality of nodes according to the initial distribution rule. The method further comprises creating in each node of the at least part of the plurality of logical nodes a physical target table for storing the rows associated to said each node, wherein retrieving the identified rows is performed from the original tables.

According to one embodiment, the initial distribution rule is different from the new distribution rule or the same as the new distribution rule. The new distribution rule being the same as the initial distribution rule may be advantageous in case the structure of the distributed database system has changed, e.g., if the initial distribution rule requires an even distribution of rows over existing nodes, the reapplication of that rule on a changed system e.g., with additional nodes, may lead to a different distribution of the rows.

According to one embodiment, identifying the rows comprises applying the initial distribution rule for determining the rows associated with the at least part of the plurality of logical nodes without storing them. That is, the initial storage of the table into the respective original tables of the logical nodes may not be needed. For example, the creation of a physical original table in the first place may not be needed as the data may be collected from other tables and stored directly—with the new distribution rule—in the new tables.

According to one embodiment, the distributed database system is configured to distribute the table rows across the plurality of logical nodes in accordance with a distribution method. The distribution method comprises at each specific logical node of the plurality of logical nodes: a row to node assignment step comprising identifying, according to the distribution rule, target nodes and rows of the specific logical node to be copied into the target nodes, and a pushing step comprising copying the rows from the specific logical node to respective identified target nodes. The method further comprises adapting the distribution method so that the distribution method comprises at the each current logical node: determining candidate source nodes of the plurality of logical nodes, triggering execution of the row to node assignment step on each candidate source node, wherein the identified source nodes are nodes of the candidate source nodes that have identified the current logical node as target node, and replacing the pushing step by a pulling step, the pulling step being executed at the current logical node for performing the retrieving.

This embodiment may enable to apply the new distribution rule on the original table of each of the candidate nodes to identify which rows go to which nodes and the storage method is executed on the target node (rather than on source nodes) in order to copy the data according to the distribution method. This embodiment may be advantageous as it may seamlessly be integrated in existing systems. For example, existing distribution methods may be adapted according to an improved distribution according to the present subject matter by maintaining the distribution rule unchanged and adapting the storage methods.

According to one embodiment, the candidate source nodes are: all logical nodes of the plurality of logical nodes or nodes of the plurality of logical nodes that are predicted to provide data to the current logical node according to the distribution rule. The current logical node may query the candidate source nodes to identify which rows are to be copied into the current logical node. The candidate logical nodes may be all logical nodes of the distributed database system. This may be advantageous as the efficiency of the distribution may be improved because the probability to miss a node that has data to be copied to the current logical node is almost zero. In another example, the candidate logical nodes may be nodes of the plurality of logical nodes which are expected to contain data to be copied to the current logical node e.g., this is due to the fact that the original table may not exist on all logical nodes but only on a true subset thereof. This may be predicted by using, for example, historical data comprising log data that results from the execution of the distribution method on previous tables. This may be advantageous as it may save processing resources that would otherwise be required to apply unnecessarily the distribution rules on some nodes which do not contain data to be copied to the current logical node.

According to one embodiment, the execution of the row to node assignment step comprises: creating a lookup table comprising distinct values of a distribution key of the distribution rule and associated target nodes and using the created table for identifying the target nodes and corresponding rows. For example, the lookup table may be created once and then each node may use it.

This embodiment may be advantageous because building the lookup table may be much faster than copying all rows from the original table to a new table since the lookup table has much fewer columns Thus, the data volume for the lookup table is significantly smaller, which implies less resources are needed to build the lookup table—even if 2× network communication is needed for each lookup row. The lookup table may have significantly fewer rows if the values used for the distribution rule of the new table are not unique and have duplicates. For example, only one row may be created in the lookup table for each distinct value. For example, if there is an index on a column C on the original table, and that column C is used for the new distribution rule, it may be sufficient to scan the index only, which may be much faster than scanning the whole table. Hence, building the lookup table itself can be very fast overall.

According to one embodiment, the method further comprises sorting the retrieved rows and storing the retrieved rows in the target table in accordance with the sorting order. This embodiment may enable to physically sort/align the rows to optimize the storage layout. This embodiment may further be advantageous because the sorting is performed at once for all pulled rows. This is by contrast to the pushing approach where the sorting may be repeated multiple times for the same number of rows to be stored.

According to one embodiment, the distributed database system is configured to distribute the table rows across the plurality of logical nodes in accordance with a first distribution method. The method is performed in response to receiving a request to redistribute the rows in accordance with a second distribution method that involves the distribution rule.

FIG. 1 illustratively shows a distributed database system 100 according to an example of the present subject matter. The distributed database system 100 comprises logical nodes 101.1, 101.2, and 101.3 (collectively referred to as nodes 101). Nodes 101 may be communicatively coupled with each other via computer networks (not shown). In FIG. 1 it is shown three nodes, which is merely exemplary. In practice, there may be hundreds of nodes. The node may also be referred to as logical database partition, wherein the database partition is a part of a database that consists of its own data, indexes, configuration files, and transaction logs. Thus, the distributed database system 100 enables a partitioned database environment. A logical database partition differs from a physical partition in that the logical database partition is not given control of an entire machine. Although the machine has shared resources, database partitions may not share the resources. Processors are shared but disks and memory are not. For example, two or more database partitions may coexist on the same machine (regardless of the number of processors).

The distributed database system 100 may be configured to store data of a table T of an application 103 such as an IBM Db2® Analytics Accelerator (IDAA) appliance. The distributed database system 100 may be configured to perform a data organization scheme in accordance with an initial distribution method where rows of the table T are divided across the nodes 101 according to values in one or more table columns. As shown in FIG. 1, each of the nodes 101 has an original table (named "Original Table") which stores the rows initially assigned to that node according to the initial distribution method. Partitioning or distribution of data may improve performance and simplify data management. The application 103 may be configured to store, manage, and access data in the distributed database system 100. The table that is initially distributed in the distributed database system 100 may, for example, be created on the fly e.g., from other existing tables. The original table of each logical node may be filled with its respective set of rows based on a pulling approach using for example the following SQL statement: INSERT INTO <original-table>; SELECT *; FROM (SELECT data FROM other-table1, other-table2 WHERE . . . ); WHERE<predicate-identifying-rows-to-be-stored-on-currently-connected-to-node>; ORDER BY . . . .

This initial storage of the table T into the respective original tables of the logical nodes may be optional. For example, the creation of a physical "Original Table" in the first place may not be needed as the data may be collected from other tables and stored directly—with the desired distribution—in the "New Table" as described in the following. In such a situation, the "Original Table" may be virtual, and its data is the result set of the statement "(SELECT data FROM . . . WHERE . . . )". This may prevent creating "Original Table" as a real table and storing the data in it.

After the initial storage of the table T in the distributed database system 100, the distributed database system 100 may be configured to (re)distribute the rows of the table T across the plurality of logical nodes 101.1 to 101.3 in accordance with a second distribution method. The second distribution method may be executed at each logical node of the plurality of logical nodes 101.1 to 101.3. FIG. 1 illustrates the execution of the second distribution method in the logical node 101.1 which is thus considered as the coordinator node. The second distribution method may comprise a row to node assignment step and a pushing step. The execution of the row to node assignment step in a specific logical node comprises the identification, according to a distribution rule, of target nodes and rows of the original table of the specific logical node to be copied into the target nodes. The distribution rule may, for example, involve a condition on a distribution key of the table T. The distribution key may comprise one or more attributes of the table T. The distribution key of the second distribution method may be different from the distribution key of the initial distribution method. The pushing step comprises copying the rows of the original table from the specific logical node to respective identified target nodes. This is indicated by the three arrows from the coordinator node 101.1 to the new tables. Thus, after executing the second distribution method in each of the nodes 101.1 to 101.3, the table rows may be stored across the nodes 101.1 to 101.3 according to the distribution rule in the new tables (each named "New Table"). Thus, the logical nodes may comprise original tables that comprise the rows of the table T distributed according to the initial distribution method and new tables that comprise the rows of the table T distributed according to another different distribution method.

Assuming, for example, that the distribution key of the second distribution method is an attribute ID of the table T. The distribution rule may apply a round-robin algorithm on each value of the distribution key using the following function MOD(ID, 3) which provides the remainder from a division of the value of the attribute ID and 3, where 3 refers to the number of nodes 101.1 to 101.3. The result of the function MOD(ID, 3) may be a number that identifies one of the nodes 101.1 to 101.3. For example, the execution of the second distribution method at the node 101.1 may identify three groups of rows that need to be stored in the nodes 101.1, 101.2 and 101.3, respectively. The node 101.1 may then send the two groups of rows to the respective nodes in order to be stored e.g., using INSERT statement, and store locally in the new table the third group of rows assigned to the node 101.1. Similarly, the execution of the second distribution method at the node 101.2 may identify three groups of rows that need to be stored in the nodes 101.1, 101.2 and 101.3 respectively etc. As indicated in FIG. 1, the redistributed rows are stored in the new tables in the nodes 101. Thus, after redistribution each of the nodes may comprise one original table and one new table, that each comprises different rows of the table T, wherein the original and new tables may, for example, be associated with different distribution keys. However, these distribution methods may be challenging because the connection to each node and the execution of the INSERT statements on each node may result in n concurrently running INSERT statements on each node, wherein each of those INSERT statements needs space (data pages/extents) to store the rows to be written. This distribution of the rows of the table T may further be improved by the present subject matter by using another distribution method as described with reference to FIGS. 2A, 2B, 2C, and 2D.

Figure 2A:
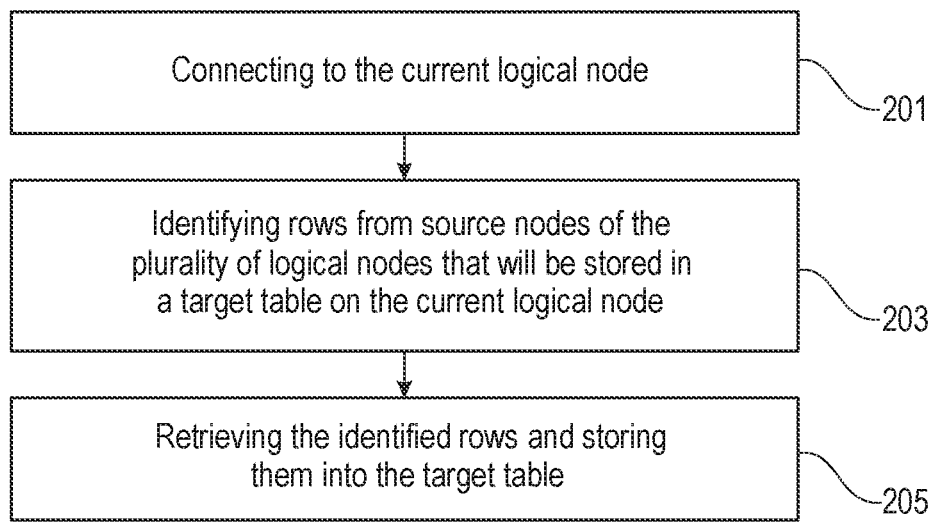
FIG. 2A is a flowchart of a method for distributing rows of a table in a distributed database system in accordance with an example of the present subject matter.
Figure 2B:
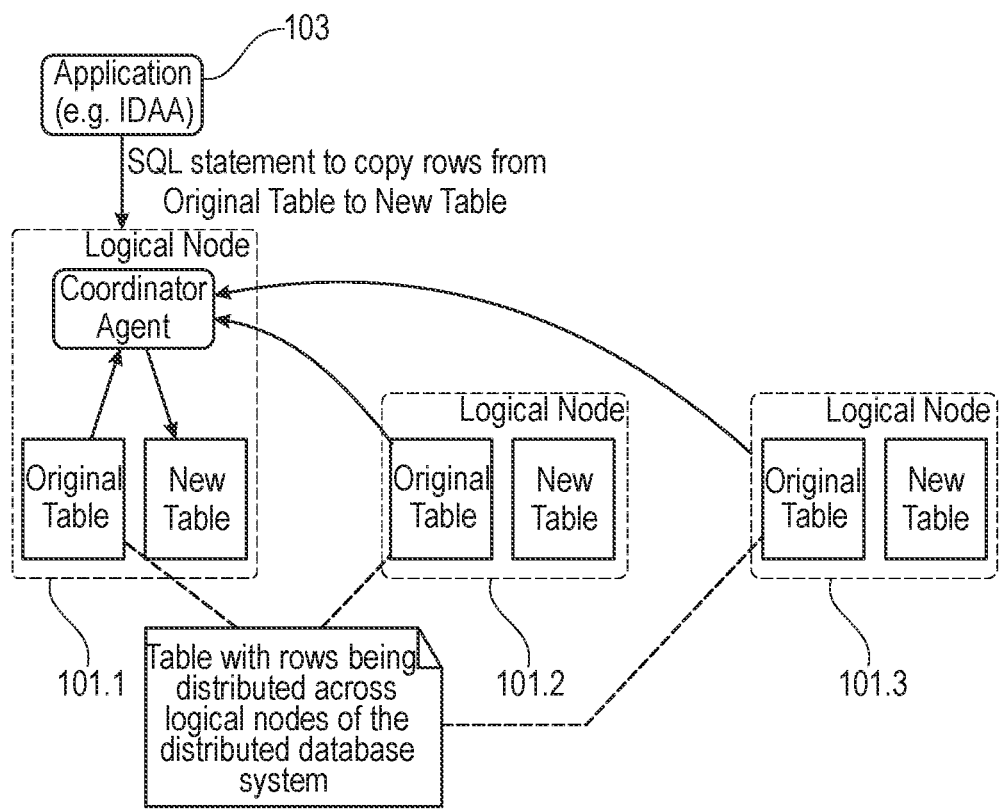
FIG. 2B illustrates the data flow in a distributed database system in accordance with an example distribution method of the present subject matter.
Figure 2C:
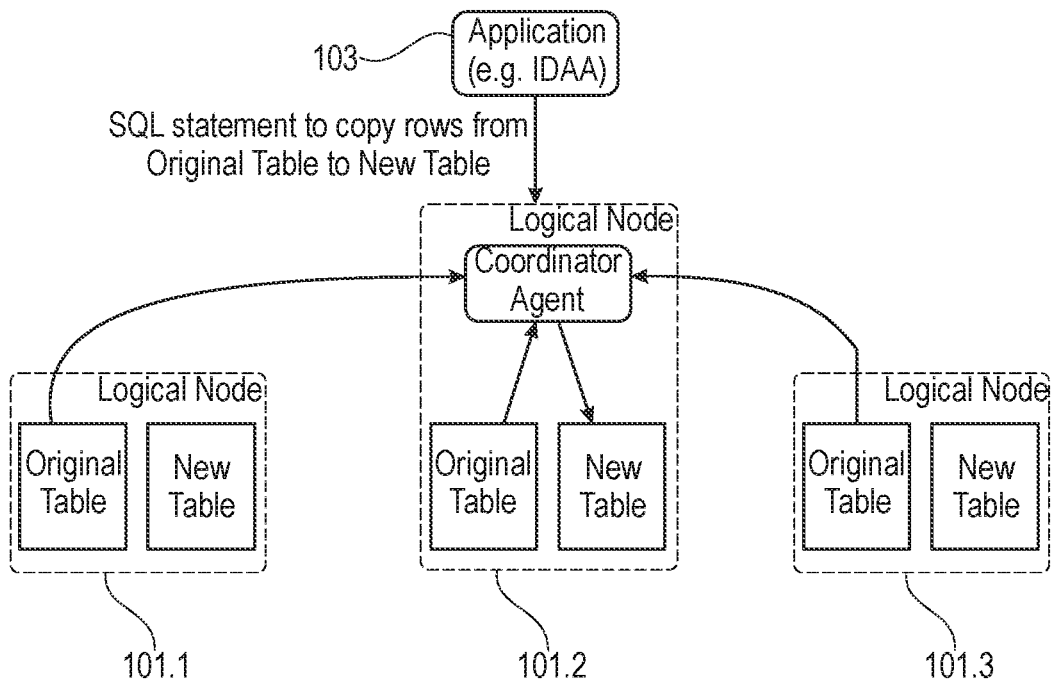
FIG. 2C illustrates the data flow in a distributed database system in accordance with an example distribution method of the present subject matter.
Figure 2D:
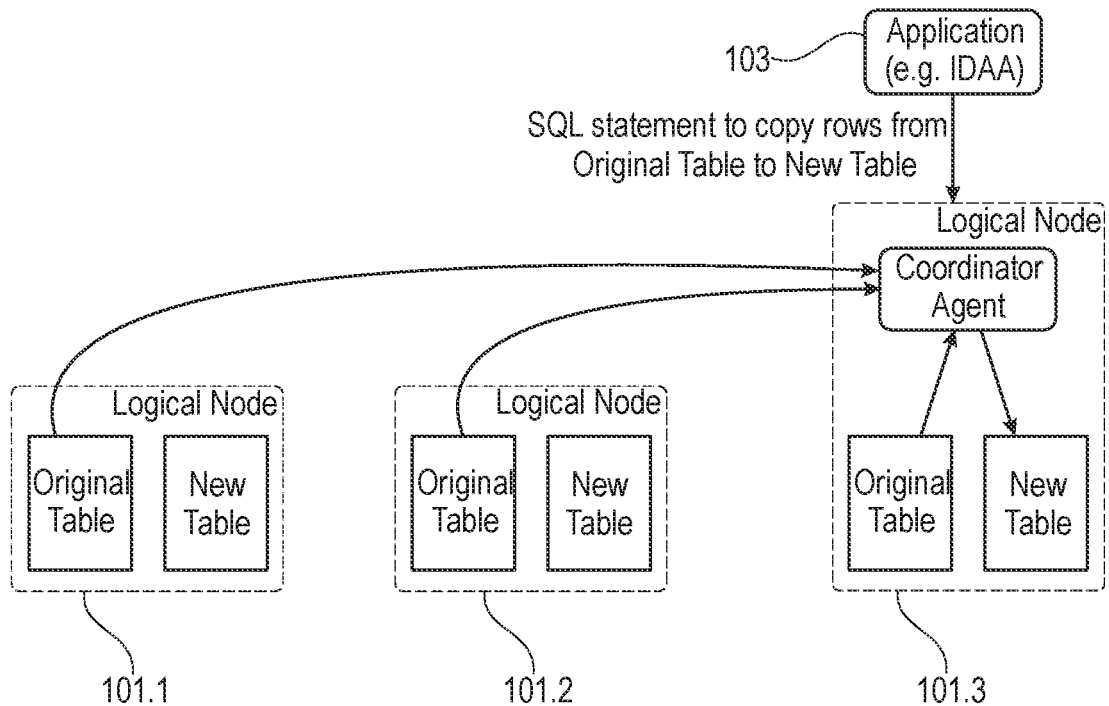
FIG. 2D illustrates the data flow in a distributed database system in accordance with an example distribution method of the present subject matter.

FIG. 2A is a flowchart of a method for distributing rows of a table in a distributed database system. The method described in FIG. 2A may be implemented in the system illustrated in FIG. 1 but is not limited to this implementation. The method of FIG. 2A may be performed for each logical node of the logical nodes 101.1, 101.2, and 101.3. The results of these executions are illustrated with FIGS. 2B, 2C and 2D. The method of FIG. 2A may, for example, provide an alternative implementation of the initial or second distribution method described above.

The application 103 may connect to the current logical node in step 201. The current logical node may thus be the coordinator node. Since all logical nodes are parts of the same database system, the coordinator node may be responsible for the overall processing of SQL statements e.g., by delegating parts of the SQL statements to other nodes.

For example, the connection to a specific node can be accomplished in ODBC with the attribute "ConnectNode=X" where X is the numeric identifier of the specific node. A database request from the application 103 may be transformed into communication protocols suitable for use in the distributed database system 100. These requests are received and processed by a node at the other end of the connection. This may enable the application 103 to operate as if it were accessing a local database.

The current logical node may identify in step 203 rows from source nodes of the plurality of logical nodes that will be stored in a new table on the current logical node according to a specific distribution rule. For example, step 203 may execute a SQL statement that only selects those rows from all logical nodes that will be stored on the current logical node according to the specific distribution rule. Following the example of FIG. 1, the original table in each logical node may be used to select the rows that needs to be copied into the current logical node according to the distribution rule involving the MOD function.

The identified rows may be retrieved from the original tables and stored in step 205 into the new table of the current logical node. This may enable to pull the rows from the source nodes to the current logical node. The execution of steps 203 and 205 may be triggered or initiated by the application 103. For example, the application 103 may control the current logical node (e.g., through control signals) to perform steps 203 and 205.

The two steps 203 and 205 may, for example, be executed using the following SQL statement: INSERT INTO "New Table"; SELECT * FROM "Original Table"; WHERE<predicate-identifying-rows-to-be-stored-on-currently-connected-to-node>; ORDER BY . . . .

The last statement ORDER BY allows to sort the selected rows before being inserted or stored in the new table in accordance with the sorting order. The coordinator node may prepare the SQL statement and send the query portion (i.e., the SELECT statement including the WHERE statement) of the SQL statement to each logical node. Each logical node executes that SELECT statement and produces a (partial) result set for the data it has stored itself. Each logical node sends its (partial) result set back to the coordinator node. Those are indicated by the black arrows pointing from the original tables to the coordinator node in the FIGS. 2B, 2C and 2D. The coordinator node combines all partial result sets (including the one that it produced itself), sorts all rows, and then writes all rows to the new table.

The predicate of the WHERE statement allows to select the rows to be copied in the current logical node. It identifies all those rows that will be stored on the current logical node.

In a first predicate example, the predicate may be defined using the distribution rule as follows. Following the above distribution rule involving the MOD function, the predicate (and thus WHERE statement) may be defined as follows: WHERE MOD(ID,3)=CURRENT DBPARTITIONNUM, where CURRENT DBPARTITIONNUM refers to the identifier of the current logical node.

In a second predicate example, the predicate may be defined as follows. A lookup table may be built in each of the nodes as follows: CREATE TABLE "Lookup Table" (<new-distribution-key-columns>) DISTRIBUTE BY ( . . . ); INSERT INTO "Lookup Table"; SELECT UNIQUE <new-distribution-key-columns>; FROM "Original Table".

The lookup table contains all the values on which the row distribution is based. Since the lookup table is a regular table, and it uses the same distribution key as the new table, all rows inserted into the lookup table will use the target distribution already. The benefit is that building the lookup table may be much faster than copy all rows from original table to new table since the lookup table has much fewer columns. Thus, the data volume for the lookup table is significantly smaller, which implies less resources are needed to build the lookup table—even if 2× network communication may be needed for each lookup row.

With the lookup table present, the WHERE clause may be defined as follows: WHERE <distribution-key-columns>IN; (SELECT *; FROM "Lookup Table"; WHERE DBPARTITIONNUM(id)=CURRENT DBPARTITIONNUM).

Where the argument id refers to one of the columns in "Lookup Table". The WHERE clause identifies all rows in "Original Table" which shall be stored on the current logical node according to the new distribution rule. This is done by identifying all values (or combinations thereof) of the distribution key, which are actually stored on the current node. Thus, all rows in "Original Table" with the same values in the distribution key will also be stored on the current logical node. Since each of these rows comprises solely those columns of the (new) distribution key, it can be used to identify all rows in the original table that shall be copied to the current logical node.

If the algorithm to implement steps 203 and 205 is more complex, it may be considered to implement it in a user-defined function instead of native SQL. Thus, in a third predicate example, a user defined function (e.g., named getTargetLogicalNode) may be used. The distributed database system 100 may already have an implementation of the distribution method. The user-defined function can be written to exploit that. The user defined function may receive as input the values of the columns participating in the new distribution key. The user defined function passes the values to the database system, together with the list of distribution key columns. The database system determines the target node for the received values. The target node is returned by the function. In this case, the SQL statement becomes: INSERT INTO "New Table"; SELECT * FROM "Original Table"; WHERE getTargetLogicalNode(<distribution-key-columns>)=CURRENT DBPARTITIONNUM; ORDER BY . . . .

Following the example of the distributed database system 100 of FIG. 1, the method of FIG. 2 may enable to execute the steps 201 to 205 three times in the three logical nodes 101 respectively, i.e., steps 201 to 205 may be executed in each of the three logical nodes 101. This is indicated in FIGS. 2B, 2C, and 2D. FIG. 2B indicates the result for executing steps 201 to 205 for the logical node 101.1, which is considered the coordinator node. The arrows pointing from the original tables to the coordinator node in FIG. 2B indicate the transmission of the selected rows of each original table that need to be stored in the coordinator node 101.1. All received rows are sorted by the coordinator node 101.1 and then stored in the new table of the coordinator node 101.1. Similarly, FIG. 2C indicates the result for executing the steps 201 to 205 for the logical node 101.2, which is considered the coordinator node. The arrows pointing from the original tables to the coordinator node in FIG. 2C indicate the transmission of the selected rows of each original table that need to be stored in the coordinator node 101.2. All received rows are sorted by the coordinator node 101.2 and then stored in the new table of the coordinator node 101.2. FIG. 2D indicates the result for executing the steps 201 to 205 for the logical node 101.3, which is considered the coordinator node. The arrows pointing from the original tables to the coordinator node in FIG. 2D indicate the transmission of the selected rows of each original table that need to be stored in the coordinator node 101.3. All received rows are sorted by the coordinator node 101.3 and then stored in the new table of the coordinator node 101.3.

Figure 3:
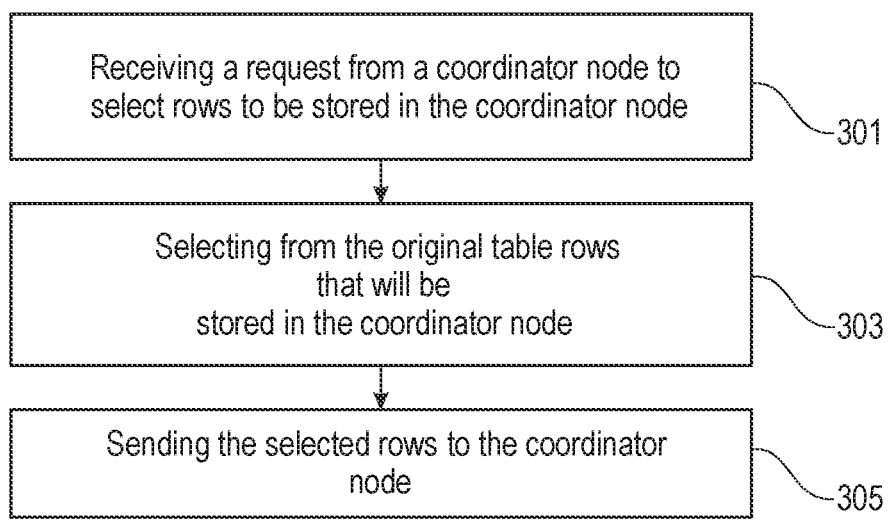
FIG. 3 is a flowchart of a method in accordance with an example of the present subject matter.

FIG. 3 is a flowchart of a method for distributing rows of a table in a distributed database system. The method described in FIG. 3 may be implemented in the system illustrated in FIG. 1 but is not limited to this implementation. The method of FIG. 3 may be performed by each logical node of the logical nodes 101.1 to 101.3, wherein the each logical node may be referred to as coordinated node.

In step 301, the coordinated node may receive a request from a coordinator node to select rows to be stored in the coordinator node. Upon receiving the request, the coordinated node may select in step 303 from the original table of the coordinated node the rows to be stored on the coordinator node. For that, the distribution rule of the distribution method may be applied on the rows of the original table to identify the rows that are assigned to the coordinator node. The coordinated node may send the selected rows to the coordinator node in step 305.

Figure 4:
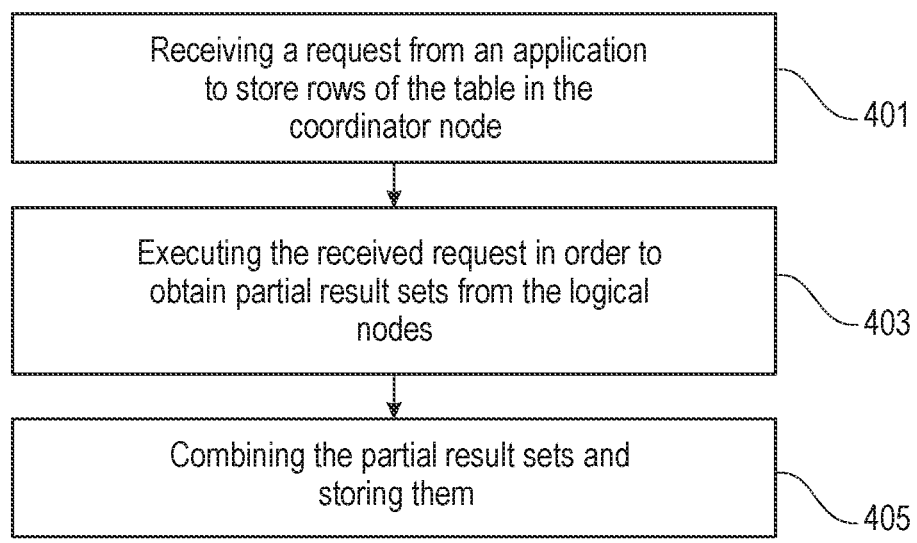
FIG. 4 is a flowchart of a method in accordance with an example of the present subject matter.

FIG. 4 is a flowchart of a method for distributing rows of a table in a distributed database system. The method described in FIG. 4 may be implemented in the system illustrated in FIG. 1 but is not limited to this implementation. The method of FIG. 4 may be performed by each logical node of the logical nodes 101.1 to 101.3, wherein the each logical node may be referred to as the coordinator node.

In step 401, the coordinator node may receive a request from the application 103. The request may be to store rows of a table into the coordinator node according to the distribution method. The received request may, for example, comprise the following SQL statement: INSERT INTO <new-table>; SELECT * FROM <old-table>; WHERE <predicate-identifying-rows-to-be-stored-on-currently-connected-to-node>; ORDER BY . . . .

The coordinator node may execute the SQL statement in step 403. Since all logical nodes are parts of the same database system, the coordinator node is responsible for the overall processing of the SQL statement. It does delegate parts of it to other nodes. More specifically, the coordinator node prepares the SQL statement and sends the query portion (just the lines "SELECT * FROM . . . WHERE . . . ") to each logical node. Each logical node executes that SELECT statement and produces a (partial) result set for the data it has stored itself. Each node sends its (partial) result set back to the coordinator node. The coordinator may also execute locally the SELECT statement to produce its own partial result.

The coordinator node combines in step 405 all partial result sets (including the one that it produced itself), sorts all rows, and then writes all rows to the new table.

Figure 5:
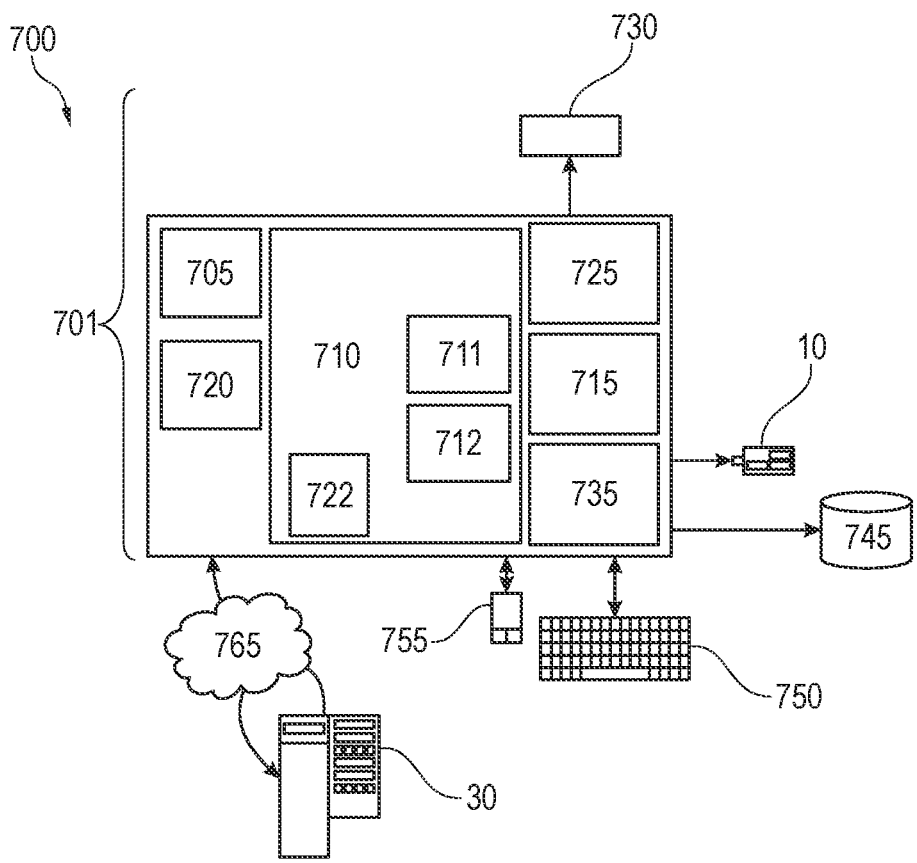
FIG. 5 represents a computerized system, suited for implementing one or more method steps as involved in the present disclosure.201

FIG. 5 represents a general computerized system 700 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 712, 722 (including firmware 722), hardware (processor) 705, or a combination thereof. In exemplary embodiments, the methods described herein are implemented in software, as an executable program, and is executed by a special or general-purpose digital computer, such as a personal computer, workstation, minicomputer, or mainframe computer. The most general system 700 therefore includes a general-purpose computer 701.

In exemplary embodiments, in terms of hardware architecture, as shown in FIG. 5, the computer 701 includes a processor 705, memory (main memory) 710 coupled to a memory controller 715, and one or more input and/or output (I/O) devices 10, 745 that are communicatively coupled via a local input/output controller 735. The input/output controller 735 can be, but is not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 745 may generally include any generalized cryptographic card or smart card known in the art.

The processor 705 is a hardware device for executing software, particularly that stored in memory 710. The processor 705 can be any custom made or commercially available processor, a central processing unit (CPU), an auxiliary processor among several processors associated with the computer 701, a semiconductor-based microprocessor (in the form of a microchip or chip set), or generally any device for executing software instructions.

The memory 710 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 710 can have a distributed architecture, where various components are situated remote from one another, but can be accessed by the processor 705.

The software in memory 710 may include one or more separate programs, each of which comprises an ordered listing of executable instructions for implementing logical functions, notably functions involved in embodiments of this invention. In the example of FIG. 5, software in the memory 710 includes instructions, e.g., instructions to manage databases such as a database management system.

The software in memory 710 shall also typically include a suitable operating system (OS) 711. The OS 711 essentially controls the execution of other computer programs, such as possibly software 712 for implementing methods as described herein.

The methods described herein in software 712 may be in the form of a source program, executable program (object code), script, or any other entity comprising a set of instructions to be performed. When a source program, then the program needs to be translated via a compiler, assembler, interpreter, or the like, which may or may not be included within the memory 710, so as to operate properly in connection with the OS 711. Furthermore, the methods can be written as an object-oriented programming language, which has classes of data and methods, or a procedure programming language, which has routines, subroutines, and/or functions.

In exemplary embodiments, a conventional keyboard 750 and mouse 755 can be coupled to the input/output controller 735. Other output devices such as the I/O devices 745 may include input devices, for example but not limited to a printer, a scanner, microphone, and the like. Finally, the I/O devices 10, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 745 can be any generalized cryptographic card or smart card known in the art. The system 700 can further include a display controller 725 coupled to a display 730. In exemplary embodiments, the system 700 can further include a network interface for coupling to a network 765. The network 765 can be an IP-based network for communication between the computer 701 and any external server, client, and the like via a broadband connection. The network 765 transmits and receives data between the computer 701 and external systems 30, which can be involved to perform part, or all the steps of the methods discussed herein. In exemplary embodiments, network 765 can be a managed IP network administered by a service provider. The network 765 may be implemented in a wireless fashion, e.g., using wireless protocols and technologies, such as WiFi, WiMAX, etc. The network 765 can also be a packet-switched network such as a local area network, wide area network, metropolitan area network, Internet network, or other similar type of network environment. The network 765 may be a fixed wireless network, a wireless local area network (WLAN), a wireless wide area network (WWAN), a personal area network (PAN), a virtual private network (VPN), intranet or other suitable network system and includes equipment for receiving and transmitting signals.

If the computer 701 is a PC, workstation, intelligent device or the like, the software in the memory 710 may further include a basic input output system (BIOS) contained in firmware 722. The BIOS is a set of essential software routines that initialize and test hardware at start-up, start the OS 711, and support the transfer of data among the hardware devices. The BIOS is stored in ROM so that the BIOS can be executed when the computer 701 is activated.

When the computer 701 is in operation, the processor 705 is configured to execute software 712 stored within the memory 710, to communicate data to and from the memory 710, and to generally control operations of the computer 701 pursuant to the software. The methods described herein and the OS 711, in whole or in part, but typically the latter, are read by the processor 705, possibly buffered within the processor 705, and then executed.

When the systems and methods described herein are implemented in software 712, as is shown in FIG. 5, the methods can be stored on any computer readable medium, such as storage 720, for use by or in connection with any computer related system or method. The storage 720 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for copying rows of a table across logical nodes in a distributed database system comprising for each logical node of a plurality of logical nodes:
    connecting, by one or more computer processors, to a current logical node of the plurality of logical nodes;
    selecting, by the one or more computer processors, one or more rows from one or more source nodes of the plurality of logical nodes to be stored in a target table on the current logical node, wherein the one or more rows are selected based on a distribution rule for distributing data in the distributed database system;
    creating in each node of the plurality of logical nodes a physical target table for storing the rows associated to the plurality of logical nodes, wherein retrieving identified rows is performed from original tables;
    adapting the distributed database system so that the distributed database system replaces a pushing step with a pulling step at the current logical node, wherein the pulling step is executed at the current logical node for performing the retrieving, and wherein the distributed database system comprises at each of the current logical node:
        triggering execution of the row to node assignment step on each candidate source node, wherein the identified source nodes are nodes of the candidate source nodes that have identified the current logical node as target node; and
    storing, by the one or more computer processors, the one or more rows into the target table, wherein the one or more rows are pulled from the one or more source nodes and stored in the current logical node.

2. The computer implemented method of claim 1, wherein selecting the one or more rows from the one or more source nodes of the plurality of logical nodes to be stored in the target table on the current logical node, wherein the one or more rows are selected based on the distribution rule for distributing data in the distributed database system further comprises:
    creating, by the one or more computer processors, an original table in each current logical node of the plurality of logical nodes, for storing the one or more rows from the one or more source nodes of the plurality of logical nodes associated with each node.

3. The computer implemented method of claim 1, wherein selecting the one or more rows from the one or more source nodes of the plurality of logical nodes to be stored in the target table on the current logical node, wherein the one or more rows are selected based on the distribution rule for distributing data in the distributed database system further comprises:
    applying, by the one or more computer processors, an initial distribution rule for selecting the one or more rows from the one or more source nodes of the plurality of logical nodes to be stored in the target table, wherein the one or more rows are not stored in the target table.

4. The computer implemented method of claim 3, wherein the distribution rule is different from the initial distribution rule, wherein the initial distribution rule is associated with an initial storage of the distributed database system.

5. The computer implemented method of claim 3, wherein the distribution rule is the same as the initial distribution rule, wherein the initial distribution rule is associated with an initial storage of the distributed database system.

6. The computer implemented method of claim 1, wherein selecting the one or more rows from the one or more source nodes of the plurality of logical nodes to be stored in the target table on the current logical node, wherein the one or more rows are selected based on the distribution rule for distributing the data in the distributed database system further comprises:
   determining, by the one or more computer processors, one or more candidate source nodes of the plurality of logical nodes, wherein the candidate source nodes are selected from a group including all logical nodes of the of the plurality of logical nodes and all predicted nodes of the plurality of logical nodes that are predicted to provide data to the current logical node; and
   further wherein the one or more candidate source nodes of the plurality of logical nodes have identified the current logical node as the target node; and
   assigning, by the one or more computer processors, each row of the one or more rows to one logical node of the plurality of logical nodes to be stored on which each row of the one or more rows is to be stored, wherein each row of the one or more rows is assigned using the distribution rule for distributing the data in the distributed database system.

7. The computer implemented method of claim 1, wherein storing the one or more rows into the target table, wherein the one or more rows are pulled from the source nodes and stored in the current logical node further comprises:
   creating, by the one or more computer processors, a lookup table comprising distinct values of a distribution key of the distribution rule; and
   identifying, by the one or more computer processors, the target nodes and one or more corresponding rows using the lookup table.

8. The computer implemented method of claim 1, further comprising:
   responsive to the rows being pulled, sorting the one or more rows selected from the one or more source nodes of the plurality of logical nodes simultaneously; and
   storing the one or more rows in the target table in accordance with a sorting order, wherein the one or more rows are physically aligned to optimize storage layout.

9. The computer implemented method of claim 1, wherein the distributed database system is configured to distribute the one or more rows of the table across the plurality of logical nodes in accordance with a first distribution method, and further wherein a distribution is performed in response to receiving a request to redistribute rows in accordance with a second distribution method using the distribution rule.

10. The computer implemented method of claim 9, wherein the first distribution method is an initial distribution method that is configured to initially distribute rows of the table in the distribution database system, resulting in the plurality of logical nodes comprising respective rows of the table.

11. The computer implemented method of claim 1, wherein selecting, by the one or more computer processors, the one or more rows from the one or more source nodes of the plurality of logical nodes to be stored in the target table on the current logical node, wherein the one or more rows are selected based on the distribution rule for distributing data in the distributed database system further comprises:
   determining, by the one or more computer processors, one or more candidate source nodes of the plurality of logical nodes;
   sending, by the one or more computer processors, a selection request to each candidate source nodes of the plurality of logical nodes for selecting rows to be stored in the current logical node; and
   responsive to sending the selection request, receiving, by the one or more computer processors, one or more identified rows from the candidate logical nodes.

12. The computer implemented method of claim 11, wherein the e or more candidate source nodes of the plurality of logical nodes are selected from a group including all logical nodes of the of the plurality of logical nodes and all predicted nodes of the plurality of logical nodes that are predicted to provide data to the current logical node; and further wherein the one or more candidate source nodes of the plurality of logical nodes have identified the current logical node as the target node.

13. The computer implemented method of claim 1, wherein the distribution rule includes at least one of evenly distributing rows across the plurality of logical nodes, grouping all rows in a specified range of a distribution key in the same logical node, and grouping all rows with similar values of the distribution key in the same logical node.

14. A computer program product for copying rows of a table across logical nodes in a distributed database system, the computer program product comprising one or more computer readable storage media and program instructions stored on the one or more computer readable storage media, the program instructions including instructions for each logical node of a plurality of logical nodes to:
   connect to a current logical node of the plurality of logical nodes;
   select one or more rows from one or more source nodes of the plurality of logical nodes to be stored in a target table on the current logical node, wherein the one or more rows are selected based on a distribution rule for distributing data in the distributed database system;
   create in each node of the plurality of logical nodes a physical target table for storing the rows associated to the plurality of logical nodes, wherein retrieving identified rows is performed from original tables;
   adapt the distributed database system so that the distributed database system replaces a pushing step with a pulling step at the current logical node, wherein the pulling step is executed at the current logical node for performing the retrieving, and wherein the distributed database system comprises at each of the current logical node:
      trigger execution of the row to node assignment step on each candidate source node, wherein the identified source nodes are nodes of the candidate source nodes that have identified the current logical node as target node; and
   store the one or more rows into the target table, wherein the one or more rows are pulled from the source nodes and stored in the current logical node.

15. The computer program product of claim 14, wherein select the one or more rows from the one or more source nodes of the plurality of logical nodes to be stored in the target table on the current logical node, wherein the one or more rows are selected based on the distribution rule for distributing data in the distributed database system further comprises one or more of the following program instructions, stored on the one or more computer readable storage media, to:

create an original table in each current logical node of the plurality of logical nodes, for storing the one or more rows from the one or more source nodes of the plurality of logical nodes associated with each node.

16. The computer program product of claim 14, wherein selecting the one or more rows from the one or more source nodes of the plurality of logical nodes to be stored in the target table on the current logical node, wherein the one or more rows are selected based on the distribution rule for distributing data in the distributed database system further comprises one or more of the following program instructions, stored on the one or more computer readable storage media, to:
apply an initial distribution rule for selecting the one or more rows from the one or more source nodes of the plurality of logical nodes to be stored in the target table, wherein the one or more rows are not stored in the target table.

17. The computer implemented method of claim 14, wherein the distribution rule is different from the initial distribution rule, wherein the initial distribution rule is associated with an initial storage of the distributed database system.

18. A computer system for copying rows of a table across logical nodes in a distributed database system, the computer system comprising:
one or more computer processors;
one or more computer readable storage media; and
program instructions stored on the one or more computer readable storage media for execution by at least one of the one or more computer processors, the stored program instructions including instructions for each logical node of a plurality of logical nodes to:
connect to a current logical node of the plurality of logical nodes;
select one or more rows from one or more source nodes of the plurality of logical nodes to be stored in a target table on the current logical node, wherein the one or more rows are selected based on a distribution rule for distributing data in the distributed database system;
create in each node of the plurality of logical nodes a physical target table for storing the rows associated to the plurality of logical nodes, wherein retrieving identified rows is performed from original tables;
adapt the distributed database system so that the distributed database system replaces a pushing step with a pulling step at the current logical node, wherein the pulling step is executed at the current logical node for performing the retrieving, and wherein the distributed database system comprises at each of the current logical node:
trigger execution of the row to node assignment step on each candidate source node, wherein the identified source nodes are nodes of the candidate source nodes that have identified the current logical node as target node; and
store the one or more rows into the target table, wherein the one or more rows are pulled from the source nodes and stored in the current logical node.

19. The computer system of claim 18, wherein select the one or more rows from the one or more source nodes of the plurality of logical nodes to be stored in the target table on the current logical node, wherein the one or more rows are selected based on the distribution rule for distributing data in the distributed database system further comprises one or more of the following program instructions, stored on the one or more computer readable storage media, to:
create an original table in each current logical node of the plurality of logical nodes, for storing the one or more rows from the one or more source nodes of the plurality of logical nodes associated with each node.

20. The computer system of claim 18, wherein selecting the one or more rows from the one or more source nodes of the plurality of logical nodes to be stored in the target table on the current logical node, wherein the one or more rows are selected based on the distribution rule for distributing data in the distributed database system further comprises one or more of the following program instructions, stored on the one or more computer readable storage media, to:
apply an initial distribution rule for selecting the one or more rows from the one or more source nodes of the plurality of logical nodes to be stored in the target table, wherein the one or more rows are not stored in the target table.

* * * * *